Dec. 12, 1950      H. HEINE      2,533,371

HOLDER FOR MICROOBJECTIVES

Filed Oct. 23, 1948

INVENTOR.
Hermann Heine
BY Benj. T. Rauber
ATTORNEY

Patented Dec. 12, 1950

2,533,371

UNITED STATES PATENT OFFICE 2,533,371

HOLDER FOR MICROOBJECTIVES

Hermann Heine, Wetzlar, Germany, assignor to Ernst Leitz G. m. b. H., Wetzlar, Germany, a corporation of Germany Application October 23, 1948, Serial No. 56,193
In Switzerland July 16, 1948

10 Claims. (Cl. 88—57)

In the use of micro-objectives of an aperture greater than about 0.70 the thickness of the cover glass and the refractive indices of the enclosing media lying between the object and the objective substantially influence the correction conditions of the image. The objectives are, for example, commonly calculated for an average cover glass thickness of 0.15 to 0.18 mm. and refractive index of $n=1.5$ which must be maintained with precision if an undistorted image is to be obtained.

Heretofore if this objective was to be used also for specimens with cover glass thicknesses which deviate from these limits, which vary between 0.11 and 0.23, it was necessary to provide them with a so-called correction attachment by means of which the distance between two groups of lenses or lens groups of the objective may be changed. The precise positioning was then restored by hand in the customary manner through large and fine movements. This search for the best position after a variation in cover glass thickness is tedious.

In order to obtain an exact positioning simultaneously with the adjustment of the correction attachment, my present invention provides a means coupled with the placement means which operates the adjustment between the object and the lens groups. More particularly this is attained through an equalizing drive, such as a differential screw or thread or leverage.

The various features of the invention are illustrated, by way of example, in the accompanying drawings in which.

Figure 1:
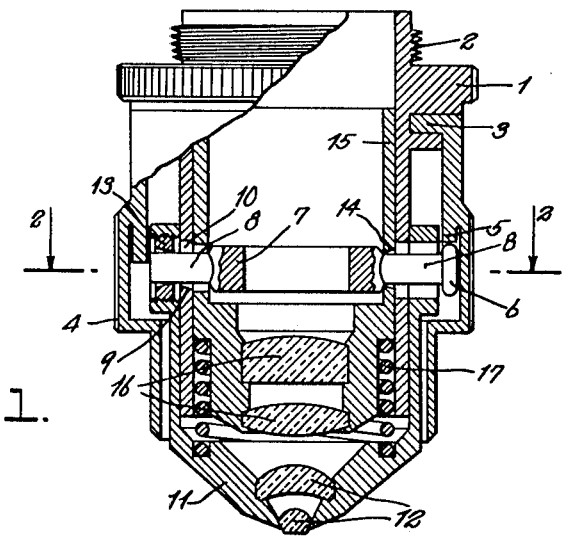
Fig. 1 shows in elevation, and partly in section taken parallel to the optical axis, a microobjective embodying the invention.

In the embodiment of the invention shown in Fig. 1 the differential adjustment of the two lens groups is obtained by means of a lever which simultaneously moves the lens group in opposite directions relative to the objective mounting and in the proper proportions to maintain precisely the correct relation to the object. This lever is actuated by suitable means as, for example, by a cam surface on an adjusting ring.

Figures 2, 3:
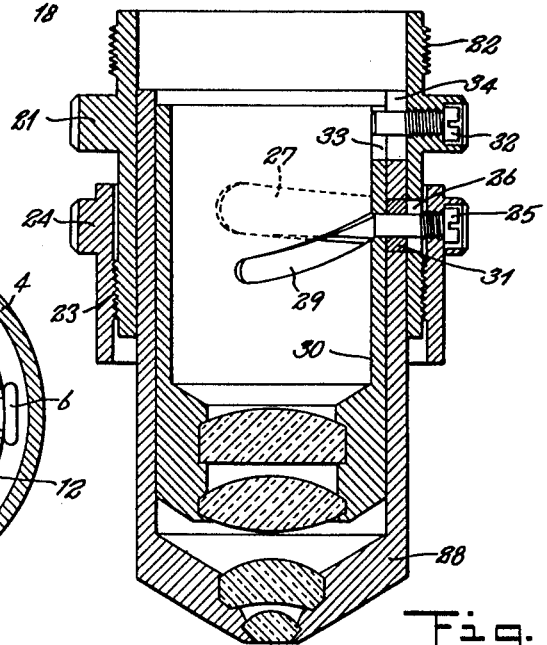
Fig. 2 is a section of the micro-objective taken on line II—II of Fig. 1.
Fig. 3 is a section on the optical axis of a microobjective embodying another form of the invention.

Referring to Figs. 1 and 2, the objective holder comprises a cylindrical element 1 provided with a threaded extension 2 for attachment to the tube of the microscope, not shown. Secured to the element 1 by means of a ring nut 3 is an adjustment ring 4 which carries on its inner wall a cylindrical cam surface 5. The cam surface 5 actuates a roller follower 6 mounted on the end of the differential lever. This lever comprises a ring 7 through which light rays may pass, and a pair of arms 8 extending from diametrically opposite sides thereof, on one of which the roller 6 is mounted. The other arm is fulcrumed on the edge 9 of an opening 10 of the holder element 1, and actuates a slidable sleeve 11 which holds the lens group 12. For this purpose it enters and engages the edges of a nut 13 having a conical hole. The other arm extends through and engages the edge of a conical opening 14 in a sliding collar 15 which holds the lens group. Between the lens holding sleeve 11 and the sleeve or collar 15 a coil spring 17 is confined.

Upon turning the regulating ring 4 the cam surface 5 presses on the lever arm 8 which by the depression of the longer arm of the lever and simultaneous raising of the shorter arm, decreases the distance of the spacing of the image lens group 16 from the object lens group by a greater amount that the latter is raised from the object 18. To adjust the effective length of the lever arm 8 relative to the sleeve 11 the nut 13 may be turned to move it radially relative to the edge 9.

In the example of Fig. 3 an objective holder element 21 is provided with a threaded extension 22 for attaching it to a tube. The element 21 also has a threaded part 23 on which a regulating collar 24 is threaded. The collar 24 carries a rod 25 which extends inwardly and freely through an arcuate slot 26 then through a slot 27 in a vertically slidable lens group carrying collar 28 and also through a slot 29 of an image lens group collar 30. The slot 27 is wider than the rod 25 and is provided with a sliding piece 31 mounted on the rod and slidably fitting the slot. The collars 28 and 30 are slidable vertically relative to each other and to the holder 21 but are kept from rotation by means of a rod 32 mounted in the element 21 and extending radially inwardly through vertical guide slots 33 and 34 in the collars 28 and 30.

The slots 27 and 29 are reversely inclined so that as the adjusting rim 24 is rotated on the element 21 the collar 30 moves upwardly and the collar 29 moves downwardly in accordance with their respective slopes obtaining movements relative to the element 21 and to each other similar to that of Figs. 1 and 2.

Having described my invention, what I claim is:

1. A microscope objective which comprises a mounting element, a pair of lens carriers independently slidable relative to said mounting element, said objective having at least two lens components, one of the lens components being mounted in each lens carrier, and a differential transmission between said mounting element and said lens carriers to move said lens carriers in opposite directions relative to said mounting element at predetermined rates to vary the focal length of said objective.

2. The objective of claim 1 in which said differential transmission comprises a lever fulcrumed on said mounting element and acting on said carriers in opposite directions.

3. The objective of claim 1 in which said differential transmission comprises a lever fulcrumed on said mounting element and acting on said carriers in opposite directions, the lever arms being unequal.

4. The objective of claim 1 in which said differential transmission comprises a lever fulcrumed on said mounting element and acting on said carriers in opposite directions and a regulating ring having a cam ring acting on one arm of said lever.

5. The objective of claim 1 in which said differential transmission comprises a pair of oppositely inclined slots from said carriers, means to hold said carriers in rotation and an actuating rod mounted on and passing through said slots.

6. A microscope objective which comprises a cylindrical mounting element, a pair of cylindrical lens carriers in said element slidable independently lengthwise therein, each lens carrier having an objective lens component therein, a lever fulcrumed in said mounting element and having one arm acting on one of said carriers and the opposite arm acting on the other carrier and regulating means to tilt said lever to vary the focal length of said objective.

7. The objective of claim 6 in which said regulating means comprises a rotatable ring having a cam surface acting on said lever.

8. The objective of claim 6 in which one of said carriers is provided with an adjusting element having a fulcrum edge on said lever and adjustable toward or from the fulcrum of said lever.

9. The objective of claim 6 having a coil spring tensioned between said carriers.

10. A microscope objective which comprises a cylindrical mounting element, a pair of co-axial cylindrical lens carriers in said element slidable independently lengthwise therein, each lens carrier having an objective lens component therein, said carriers having slots inclined lengthwise of the surface of said carriers, the slot of one carrier being inclined and in opposite direction to that of the other, means to hold said carriers from rotation relative to each other and to said mounting element and a regulating means having a rod extending through and slidable in said slots and rotatable about said mounting element to vary the focal length of said objective.

HERMANN HEINE.

REFERENCES CITED

The following references are of record in the file of this patent:

UNITED STATES PATENTS

| Number | Name | Date |
|---|---|---|
| 46,511 | Wales | Feb. 21, 1865 |
| 198,914 | Gundlach | Jan. 1, 1878 |
| 1,476,717 | Kandler et al. | Dec. 11, 1923 |
| 1,662,339 | Sabel | Mar. 13, 1928 |
| 1,889,794 | Sabel | Dec. 6, 1932 |
| 2,006,464 | Laube et al. | July 2, 1935 |
| 2,042,815 | White | June 2, 1936 |
| 2,427,689 | Osterberg et al. | Sept. 23, 1947 |